Figure 1:
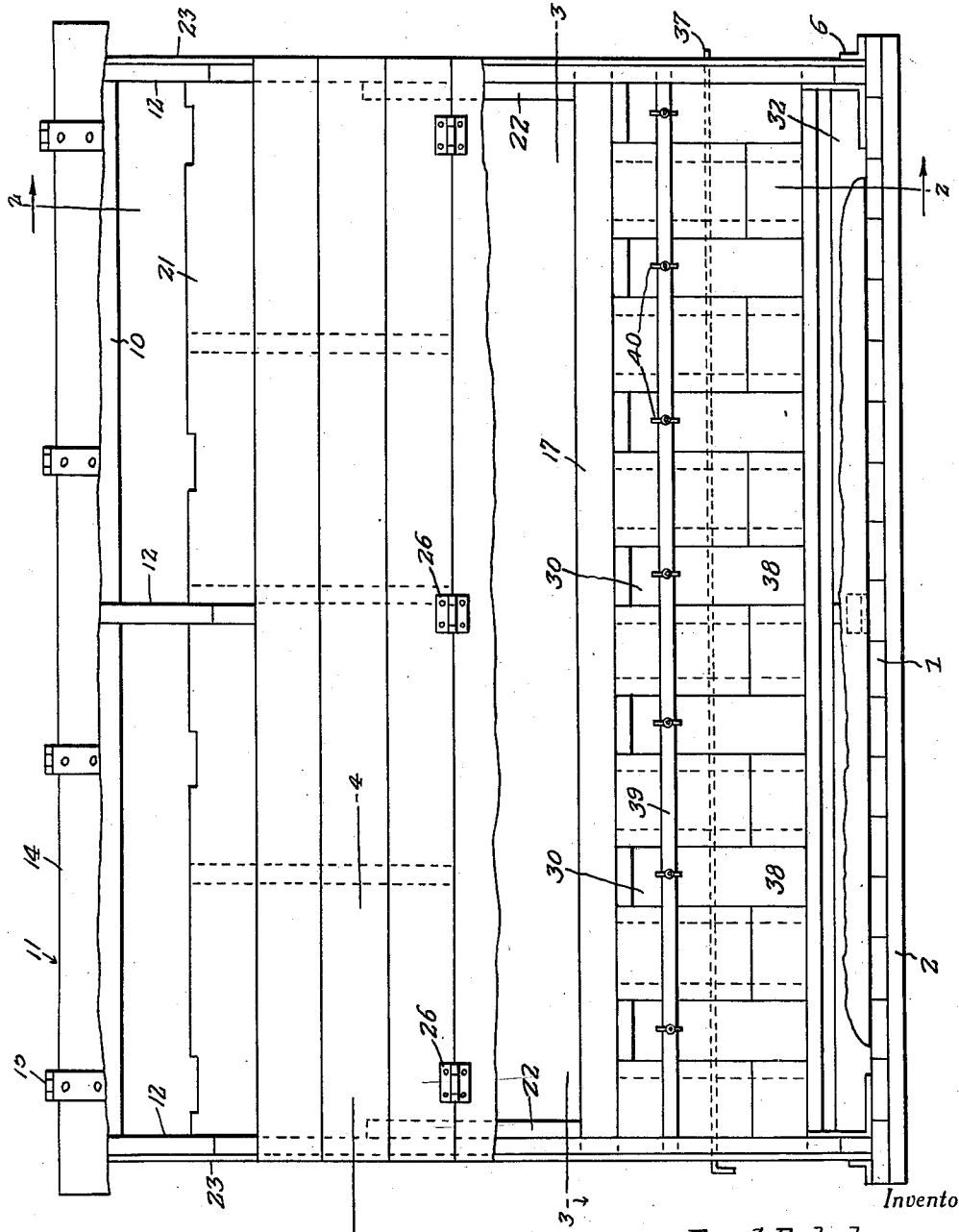

Aug. 16, 1938.　　F. REBEHN ET AL　　2,126,926
STOCK FEEDER
Filed May 10, 1937　　4 Sheets-Sheet 1

Inventors
Fred Rebehn.
M. R. Iversen.
By Clarence A. O'Brien
Hyman Berman
Attorneys

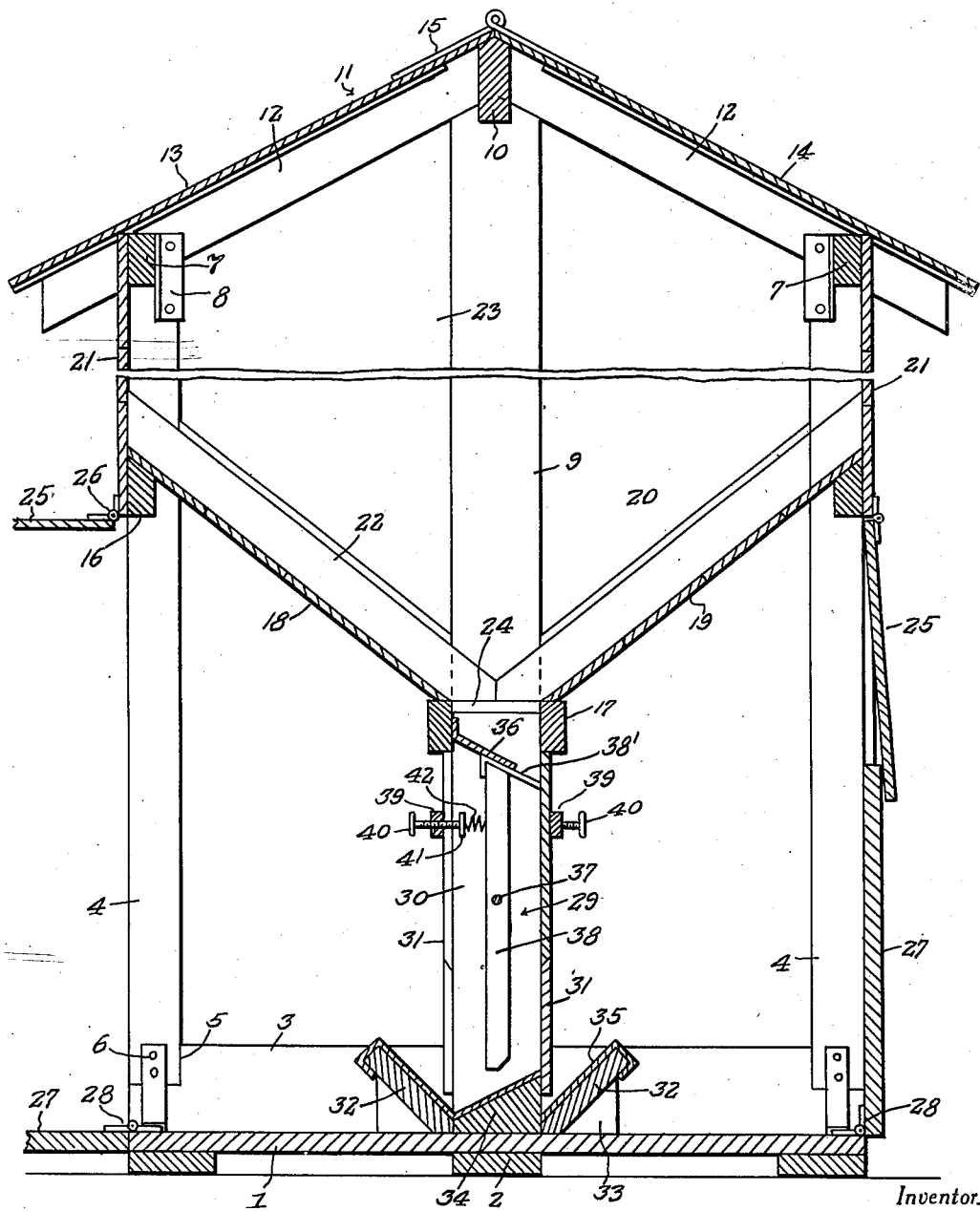

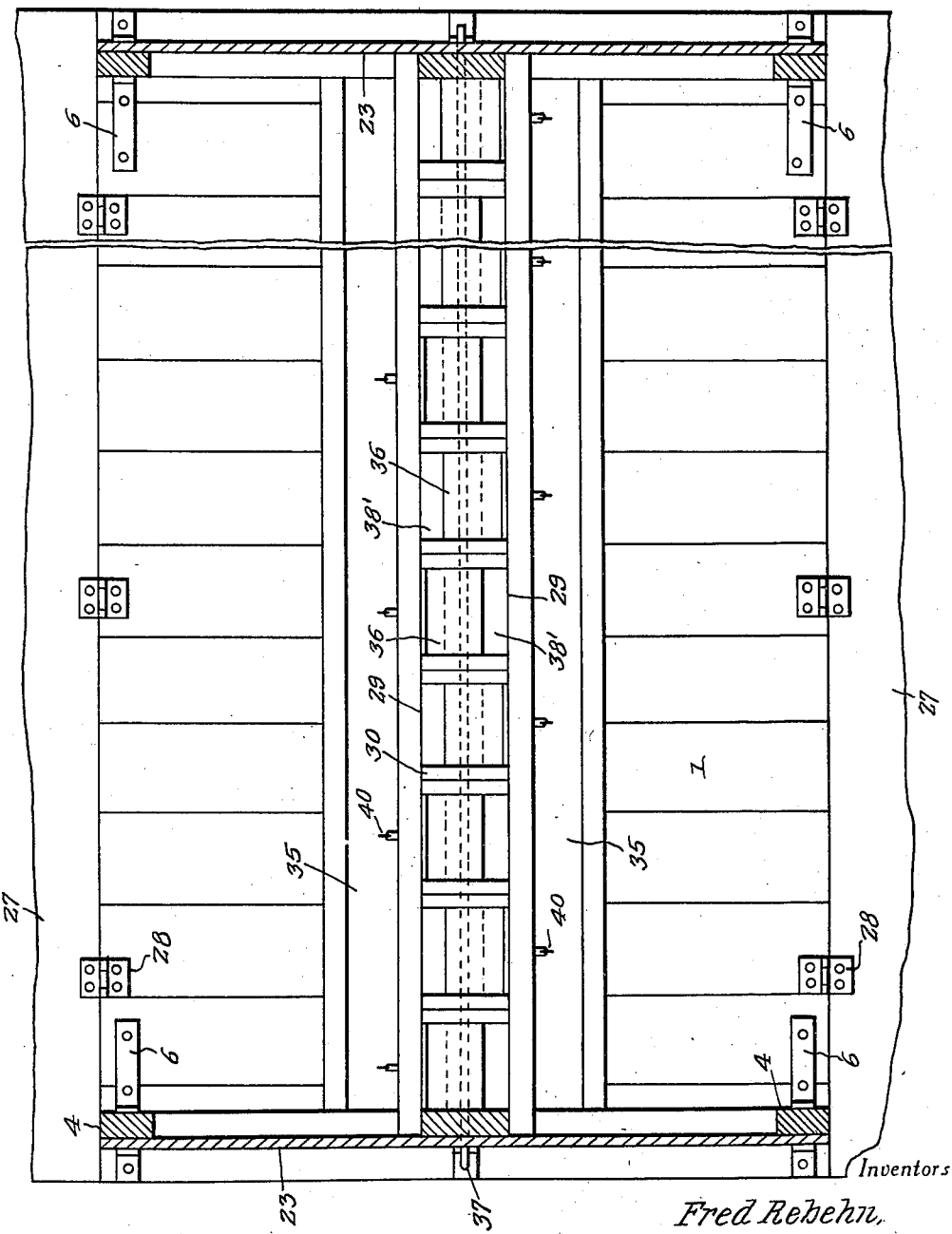

Aug. 16, 1938.  F. REBEHN ET AL  2,126,926
STOCK FEEDER
Filed May 10, 1937  4 Sheets-Sheet 4
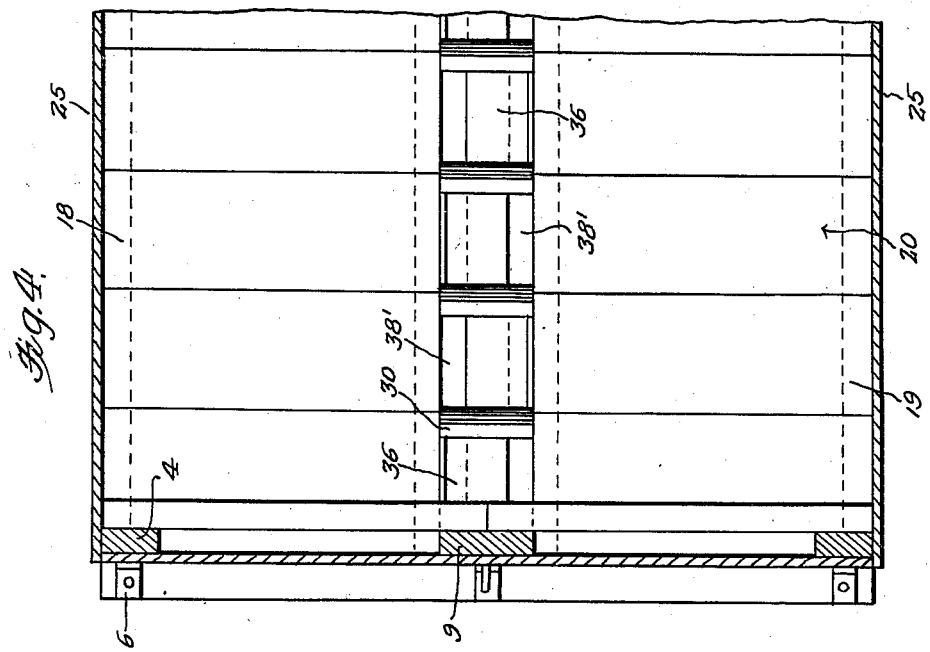
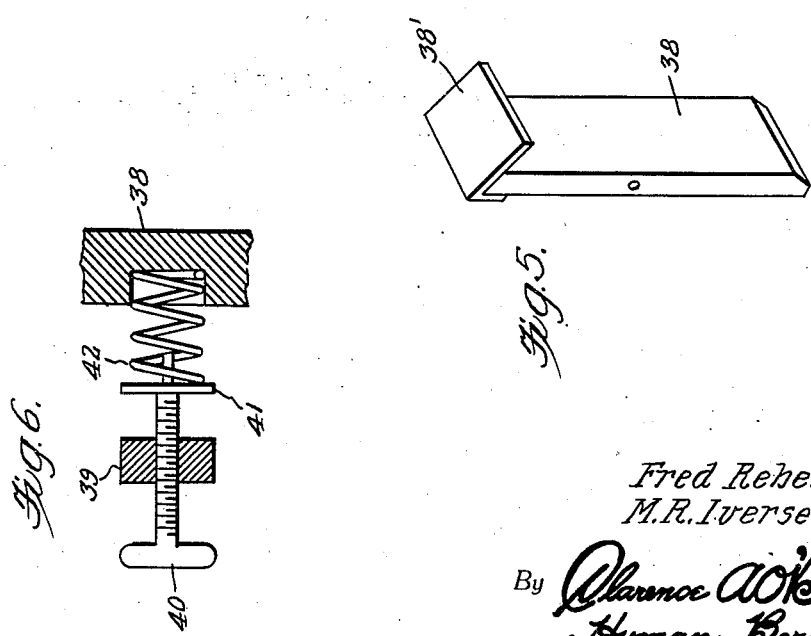
Inventors
Fred Rebehn,
M. R. Iversen,
By Clarence A. O'Brien
Hyman Berman
Attorneys Patented Aug. 16, 1938

2,126,926

UNITED STATES PATENT OFFICE 2,126,926

STOCK FEEDER

Fred Rebehn and Marinus R. Iversen, Logan, Iowa

Application May 10, 1937, Serial No. 141,787

2 Claims. (Cl. 119—53)

Our invention relates to improvements in stock feeders for use more particularly in feeding hogs.

Generally speaking, the object of our invention is to provide a self-feeder for feeding a large number of hogs under shelter and equipped to obviate waste of feed and with individual feed rationing devices for the hogs operative under rooting action of the animals to supply food thereto.

Other objects are to provide apparatus for the purpose above set forth which is strong and durable, can be readily closed against access thereto, may be easily and inexpensively built, and provides proper protection for both the food and the hogs under adverse weather conditions.

To the accomplishment of the above, and subordinate objects presently appearing, a preferred embodiment of our invention has been illustrated in the accompanying drawings, set forth in detail in the following description, and defined in the claims appended hereto.

In said drawings:

Figure 1 is a view in side elevation, partly broken away, to show the interior thereof, of a feeder constructed in accordance with our invention, Figure 2 is a view in vertical transverse section taken on the line 2—2 of Figure 1, looking in the direction indicated by the arrows, Figure 3 is a view in horizontal section taken on the line 3—3 of Figure 1, and looking downwardly, Figure 4 is a fragmentary view in horizontal section taken on the line 4—4 of Figure 1, and looking downwardly, Figure 5 is a perspective view of a feed control rocker, and Figure 6 is a fragmentary view in transverse section of variable tensioning means for said rocker.

Referring to the drawings by reference characters, in the illustrated embodiment thereof, our invention comprises a combined shelter, hopper and feeder assembly including an elongated rectangular board floor structure 1 slightly elevated from the ground by suitable joists 2 and having cross beams 3 supporting like corner posts or uprights 4 preferably mortised into said cross beams 3, as at 5, and secured thereto by angle iron brackets 6. The end posts 4 are connected together in pairs upon opposite sides of the structure by stringers 7 secured to said posts by angle brackets 8. A pair of intermediate posts or uprights 9 are secured in any suitable manner on the beams 3 between the pairs of end posts 4, respectively, in the planes of said pairs and in the longitudinal center of the structure. The posts 9 rise above the posts 4 to support a longitudinally extending ridge beam 10 for a gable roof 11 supported by end pairs of rafters 12 suitably secured to and resting upon said posts 4 and 9. The roof structure 11 is formed in two side sections 13 and 14 preferably of boards, one section 13 being fixed and the other hinged, as at 15, to the fixed section, at the ridge of the roof, to form a lid vertically swingable for a purpose presently seen. As best shown in Figures 1 and 2, the roof 11 overhangs the floor 1 at the ends and sides of the structure.

At a suitable point below the pair of side stringers 7, and suitably connected at their ends to appropriate posts 4, is a similar pair of side stringers 16 located at a height suitable for large hogs to pass thereunder. Below the level of the stringers 16 is a second pair of parallel stringers 17, suitably secured at their ends in opposed relation to opposite sides of the posts 9. The stringers 17 are disposed at a level well above the height of the average hog. The pairs of stringers 16 and 17 support opposite side sections 18 and 19 of the bottom of a feed storage hopper 20. The sides 21 of the hopper 20 are closed by siding extending between the stringers 16 and 7. At each end of the hopper 20 is a pair of overlying angled supports 22 for said sections 18 and 19 to which said sections are suitably secured. The ends 23 of the hopper 20 are formed by siding extending between the floor structure and the rafters 12. As will now be seen, the feed hopper 20 is coextensive in width and length with the ends and sides of the structure. The sections 18 and 19 terminate at their inner edges upon the pair of stringers 17, thereby providing a discharge aperture 24 in the bottom of said hopper extending throughout the length thereof.

The structure described is adapted to be closed by a pair of door sections 25 hinged to opposite sides 21 of the hopper 20, respectively, as at 26, and a pair of runway sections 27 hinged to opposite side edges of the floor 1, respectively, as at 28, said sections 25 in their closing positions overlapping the runway sections 27. As best shown in Figure 2, the door sections 25 are adapted when opened to provide side shelter extensions and the runway sections 27 when opened are adapted to provide floor extensions. Any suitable means, not shown, may be provided for securing the door sections and runway sections in closing position, and the door sections 25 in sheltering position.

Below the discharge aperture 24 is a series, or assembly, of individual separate chutes, or drops, 29, vertically disposed in each instance, and formed by partitions 30, and the intermediate posts 9. The chutes 29 are of the same width as the aperture 24 and open alternately upon opposite sides of the structure. The backs 31 of the chutes 29 are closed by siding extending between appropriate partitions 30, or between end partitions 30 and the posts 9 as the case may be.

Along each side of the series of chutes 29, at the bottom thereof, is an outwardly and upwardly inclined trough section 32 supported, at its ends, by blocks 33 and related to the chutes opening on the corresponding side of the assembly. Along the bottom of the series of chutes 29 is a base beam 34 oppositely beveled in each chute relative to the related trough section 32. A facing 35 covers the base beam 34, within each chute 29, and the related trough section 32.

Each chute 29 is partially closed at its top by a baffle plate 36 extending from one of the stringers 17 and inclining downwardly and inwardly from the open side of the chute. A pivot rod 37 extends through the series of chutes 29 intermediate the tops and bottoms thereof and is secured at its opposite ends in the posts 9 respectively.

Within each chute 29 is a vertically disposed feed control rocker 38 comprising a panel pivoted intermediate its ends on the rod 37 to rock forwardly and rearwardly of the related chute.

Fast on the top of each rocker 38 is a closure plate 38' bridging, in the normal position of the rocker, the space between the baffle plate 36 and the back of the chute 29 to close the top of said chute. The closure plate 38', in each instance, is inclined similarly to the related baffle plate 36, to facilitate gravitation of the feed into the chute and abuts the rear side of the related chute to establish the normal position of the rocker.

A pair of opposed horizontal bars 39 are suitably secured to opposite sides of the series of chutes 29 above the pivot rod 37. At the open side of each chute 29 a hand screw 40 is extended through the appropriate bar 39 into the chute. The hand screws 40 are each provided on their inner end with a collar 41. A tension spring 42 is interposed between the collar 41 of each hand screw 40 and the upper end of the related rocker 38 whereby said rocker is variably tensioned against movement from normal position.

As will be clear the rockers 38 may be easily moved from normal position, against the tension of the springs 41, by the snout of the hog thereby opening the top of the chutes to permit feed to be discharged from the hopper 20 into chutes in which said rockers are so manipulated. Obviously, two groups of hogs may feed on opposite sides of the structure described and the feeding capacity of a given length of such a structure thereby is doubled. The hopper 20 may be conveniently filled, or emptied, as the occasion may require, by way of the hinged sections 14 of the roof structure 11. When desired, the structure may be entirely closed in the manner previously described.

The foregoing description will, it is believed, suffice to impart a clear understanding of the structure, operation and advantages of my invention.

Manifestly, the invention as described in the foregoing is susceptible of modification without departing from the inventive concept and right is herein reserved to such modifications thereof as fall within the scope of the claims appended hereto.

What we claim is:

1. In a stock feeder, a floor structure, substantially rectangular, an elongated elevated feed hopper supported on said structure to extend substantially from end to end thereof and having a central discharge aperture extending longitudinally across the same, a trough secured to said floor structure beneath said aperture to extend parallel therewith from end to end thereof, a chute assembly extending along said aperture and trough between the same and comprising a plurality of vertical separate chutes opening alternately upon opposite sides of the trough, means in each chute for opening and closing the same comprising a vertically disposed rocker operative to open said chute by movement of its lower end inwardly of the chute, and means for resiliently holding said rockers against such movement comprising a pair of opposed bars extending along opposite sides of said assembly, respectively, and variable resilient devices interposed between each bar and alternate chutes respectively.

2. In a stock feeder, a floor structure, substantially rectangular, an elongated elevated feed hopper supported on said structure to extend substantially from end to end thereof and having a central discharge aperture extending longitudinally across the same, a trough secured to said floor structure beneath said aperture to extend parallel therewith from end to end thereof, a chute assembly extending along said aperture and trough between the same and comprising a plurality of vertical separate chutes opening alternately upon opposite sides of the trough, and means in each chute for opening and closing the same comprising a vertically disposed resiliently held rocker, a downwardly and rearwardly inclined plate extending over the upper end of the rocker and having a rear edge spaced from the rear wall of the chute and a similarly inclined closure plate mounted upon the upper end of said rocker for cooperation with the first-mentioned plate and said rear wall to close said space and movable to opening position by movement of the lower end of said rocker inwardly of the chute.

FRED REBEHN.
MARINUS R. IVERSEN.